Nov. 8, 1960 J. H. LEMELSON 2,959,636
MAGNETIC RECORDING
Filed Nov. 4, 1955
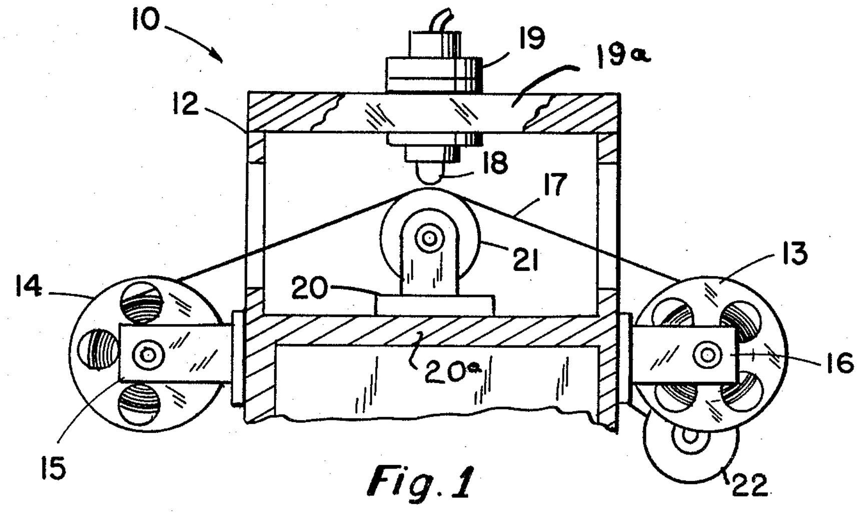
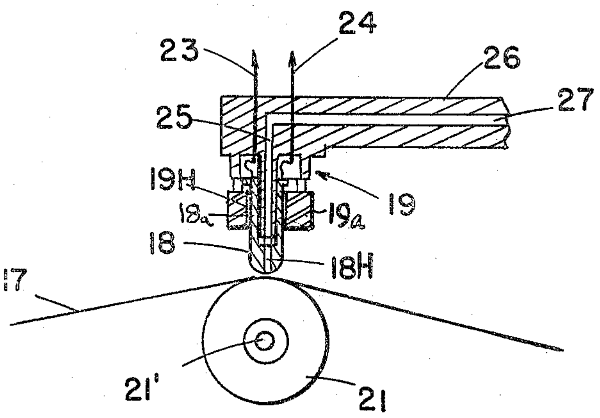
Fig. 2
INVENTOR.
Jerome H. Lemelson

United States Patent Office 2,959,636

Patented Nov. 8, 1960

2,959,636

MAGNETIC RECORDING

Jerome H. Lemelson, 289 High St., Perth Amboy, N.J.

Filed Nov. 4, 1955, Ser. No. 544,991

2 Claims. (Cl. 178—6.6)

This invention relates to magnetic recording and reproduction apparatus and, in particular, to an improved magnetic tape transport and transducer positioning device which may be utilized for high speed magnetic recording and reproducing operations.

In the conventional magnetic recording and reproducing apparatus utilizing an elongated flexible magnetic tape as a recording medium, a magnetic tape is driven between two reels or drums with a portion of the free running length of the tape between the reels being maintained in a substantially fixed path. The tape is generally driven in surface contact with a magnetic transducing head and deteriorates with time after numerous passes in sliding contact with the head. The wear, due to friction and the erosive effects of dust and other particles compressed between the tape and the head, frequently limits the life of the tape to a predetermined number of cycles or passes along the head.

Accordingly, it is a primary object of this invention to provide a new and improved magnetic tape transport which includes means for transducing signals to or from a tape without contact of the tape with the surface of a transducer.

Another object is to provide an improved magnetic tape transport having means for maintaining a free running length of the tape fixed in space and for maintaining a magnetic transducer head a fixed distance away from said length such that signals may be transduced between said transducer and said tape without wear on said tape.

Still another object is to provide an improved transport for a magnetic tape having means for always maintaining a magnetic head a fixed distance away from said tape which is less than the maximum required for transducing regardless of variations in the thickness of the tape.

With the above and other such objects in view, as may hereinafter more fully appear, the invention consists of the novel construction, combination and arrangement of parts, as will be hereinafter more fullly described and illustrated in the accompanying drawing wherein is shown an embodiment of this invention, but it is to be understood that changes, variations and modifications may be resorted to which fall within the scope of the invention as claimed.

Figure 1 is a front elevation view, partially in cross-section, of a magnetic tape transport and transducer arrangement in accordance with the present invention; and Figure 2 is a detail of a front elevation view, partially in cross-section of a portion of Figure 1 showing the transducer supported on a fluid stream at a short distance off of a magnetic tape passing over a positioning wheel.

Referring now to Figure 1, there is shown a magnetic tape transport assembly 10 including a frame 12 having mounted on respective wall portions thereof, a pair of opposed bracket mounts 15 and 16. Tape reels 13 and 14 are mounted on the respective bracket mounts. A bracket mount 20 for a tape positioning wheel 21 is mounted on a shelf 20*a*. A housing or base 19 for a magnetic transducer head 18 is mounted from a top plate 19*a*. A magnetic strip or tape 17 is driven from reel 14 over the drum 21 to take-up reel 13 by means of a conventional motor drive 22 mounted on the frame 12 and operatively connected to rotate reel 13. Conventional means may be provided for maintaining the tape, during its movement from one reel to the other, in a sufficient state of tension to always be held in intimate contact with the drum whereby the length of the tape against the surface of the drum is in a substantially fixed path in space.

In a preferred form of the invention, the magnetic transducer head 18 is axially movable in its housing or base 19 and is provided with means for conducting a fluid to the end of said head for maintaining it at a predetermined distance off of the tape 17. Further details of the transducer and its mount are illustrated in Figure 2. The head 18 is shown of oblong shape, the upper portion 18' of which is adapted for guided movement in a bore thru an end portion 19*a* of the base 19. A bore 18H extends axially thru the head 18 and is in alignment with a bore 25 extending thru the end portion 19*a* of the head-mount which communicates with a bore 27 in a conduit 26. The bore 27 is connected to a source of fluid under pressure (not shown) which flows therethru and to the opening 18H in head 18. The pressure of the fluid is applied against that portion of tape 17 passing over the wheel. By adjustment of the pressure of the fluid passed thru conduit 26, the head may be made to ride at a predetermined distance off of the tape so that it does not make contact therewith. The pressure is regulated and adjusted so that the head 18 is virtually floated on the airstream formed by pressure of the fluid a distance above the tape which is substantially constant. If this distance is maintained at 0.0005 inch or less, signals are transduced either to or from the tape by means of the magnetic characteristic of the tape and the transducer head 18. The conductors 23 and 24 are wires connected to the magnetic head of the head 18 and are sufficiently slack in the area where they connect to the head 18. The conductors 23, 24 are connected to a source of external excitation or reproduction amplification. A slight movement of the head is permitted so that it is maintained in a floating condition off of the tape.

The idler wheel 21 may be fixedly mounted or rotationally mounted on a shaft 21' which is supported in bearing on the frame 12. If wheel 21 is fixedly mounted, it is made of or coated with a low friction coefficient material such as polytetrafluorethylene, or the like so that the tape will experience less frictional wear as it travels over the idler.

It should be understood, however, that the specific apparatus herein illustrated and described is intended to be representative only, as many changes may be made therein without departing from the clear teachings of the invention. Accordingly, reference should be made to the following claims in determining the full scope of the invention.

I claim:

1. Magnetic recording and reproducing transducer apparatus comprising in combination an elongated flexible magnetic recording tape, a magnetic transducer means, means for driving said tape over a surface of an idler member to position the tape relative to the magnetic transducer means, means tensioning said tape as it moves over said idler member surface to maintain it there against said magnetic transducer means including a transducer head movably mounted in alignment with said idler member in a predetermined path from a position remote from said idler member to a position close to the surface thereof over which said tape travels, said idler member being fixed relative to said tape, the surface of said idler member over which said tape passes being coated with a material having a low coefficient of friction for reducing friction and wear on said tape as it passes thereover, means for positioning and maintaining said transducer head at a predetermined distance off of said tape and said idler member without said head touching said tape as the tape is driven by the driving means, said head positioning means including means for producing a flow of fluid between said head and a portion of said tape supported by said idler member whereby said head is lifted and maintained said predetermined distance off said tape by said fluid from said fluid producing means reacting against said tape as supported by said idler member.

2. Magnetic recording and reproducing transducer apparatus in accordance with claim 1, wherein said material is polytetrafluorethylene.

References Cited in the file of this patent

UNITED STATES PATENTS

| | | |
|---|---|---|
| 2,380,392 | Begun | July 31, 1945 |
| 2,381,463 | Potter | Aug. 7, 1945 |
| 2,496,047 | Goddard | Jan. 31, 1950 |
| 2,517,808 | Sziklai | Aug. 8, 1950 |
| 2,581,765 | Mann | Jan. 8, 1952 |
| 2,612,566 | Anderson | Sept. 30, 1952 |
| 2,614,169 | Cohen | Oct. 14, 1952 |
| 2,657,377 | Gray | Oct. 27, 1953 |
| 2,680,785 | Franklin | June 8, 1954 |
| 2,698,875 | Greenwood | Jan. 4, 1955 |
| 2,772,135 | Hollabaugh et al. | Nov. 27, 1956 |